United States Patent
Authement et al.

(10) Patent No.: US 10,445,016 B2
(45) Date of Patent: Oct. 15, 2019

(54) TECHNIQUES FOR STORAGE COMMAND PROCESSING

(71) Applicant: INTERNATIONAL BUSINESS MACHINES CORPORATION, Armonk, NY (US)

(72) Inventors: Shawn P. Authement, Round Rock, TX (US); Kevin A. Bosien, Richmond, TX (US); Christopher M. Dennett, Houston, TX (US); David E. Mullen, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/376,835

(22) Filed: Dec. 13, 2016

(65) Prior Publication Data

US 2018/0165038 A1     Jun. 14, 2018

(51) Int. Cl.
    *G06F 3/06*      (2006.01)

(52) U.S. Cl.
    CPC ............ *G06F 3/0659* (2013.01); *G06F 3/061* (2013.01); *G06F 3/0679* (2013.01)

(58) Field of Classification Search
    CPC ...... G06F 3/0659; G06F 3/061; G06F 3/0679; G06F 9/52; G06F 9/5016; G06F 9/544; G06F 9/524; G06F 12/0284
See application file for complete search history.

(56) References Cited

U.S. PATENT DOCUMENTS

| | | | |
|---|---|---|---|
| 6,915,354 B1 * | 7/2005 | Ozdemir | G06F 13/102 70/20 |
| 8,601,169 B1 * | 12/2013 | Paragaonkar | G06F 3/0613 710/52 |
| 8,751,737 B2 | 6/2014 | Bu et al. | |
| 9,176,872 B2 | 11/2015 | Mortier | |
| 9,223,638 B2 | 12/2015 | Hudzia et al. | |
| 2008/0066066 A1 | 3/2008 | MacPherson | |
| 2011/0131375 A1 * | 6/2011 | Noeldner | G06F 12/00 711/114 |
| 2015/0186068 A1 * | 7/2015 | Benisty | G06F 3/0673 711/154 |
| 2015/0331720 A1 | 11/2015 | Huetter et al. | |

* cited by examiner

*Primary Examiner* — Yaima Rigol
(74) *Attorney, Agent, or Firm* — Michael R. Long; Wenjie Li

(57) ABSTRACT

A technique for handling storage commands includes receiving, by an interface node of a data storage system, a first storage command. The interface node determines whether the first storage command is a head of queue (HOQ) command. In response to determining the first storage command is an HOQ command, the interface node increments a constrained command count and issues the first storage command to a first worker processor core for processing. In response to determining the first storage command is not an HOQ command, the interface node processes the first storage command as a non-HOQ command.

15 Claims, 13 Drawing Sheets

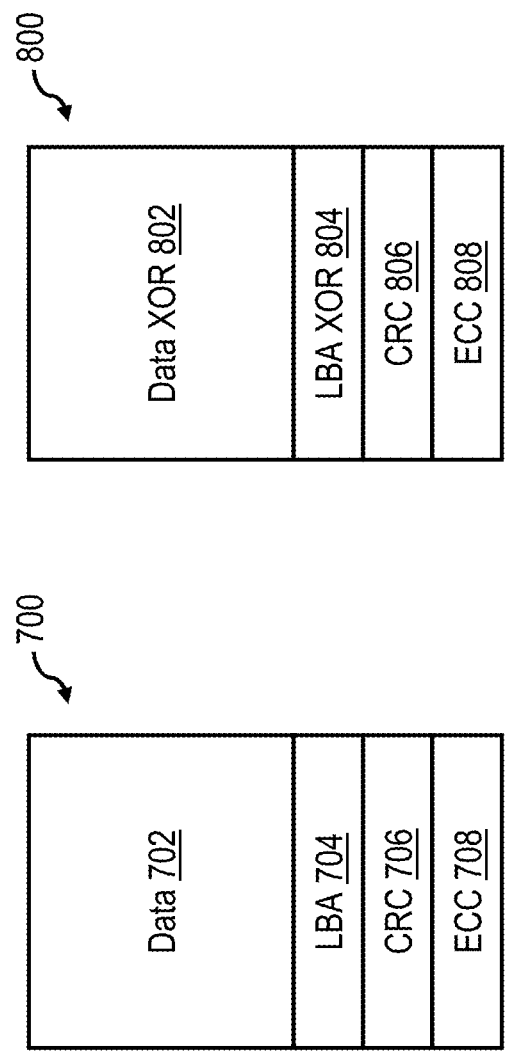

TECHNIQUES FOR STORAGE COMMAND PROCESSING

BACKGROUND OF THE INVENTION

This disclosure relates to data processing and storage, and more specifically, to techniques for storage command processing in a data storage system, such as a flash memory system.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Small Computer System Interface (SCSI) defines a set of standards for physically connecting and transferring data between computers and peripheral devices. Conventionally, SCSI has commonly been used for hard disk drives and tape drives. Today, SCSI is also used for flash memory based data storage systems. The SCSI standard defines command sets for specific peripheral device types. The SCSI command architecture was originally defined for parallel SCSI buses, but has been adapted with minimal change for use with Internet SCSI (iSCSI) and serial SCSI. In SCSI terminology, communication takes place between an initiator and a target. An initiator sends a command to a target, which responds in some manner to the command.

SCSI commands are sent in a command descriptor block (CDB) that includes a one byte operation code followed by five or more bytes that include command-specific parameters. At the end of a command sequence, a target returns a status code byte, such as 00h for success, 02h for an error, or 08h for busy. There are four categories of SCSI commands: N (non-data), W (writing data from initiator to target), R (reading data), and B (bidirectional). Among other commands, SCSI commands include: a read command, which causes data to be read from a target device; and a write command, which causes data to be written to a target device. Each device on a SCSI bus is assigned a unique SCSI identifier (ID). Devices may encompass multiple logical units that are addressed by logical unit number (LUN). Simple devices have just one LUN, more complex devices may have multiple LUNs.

SCSI command tag queuing refers to queuing multiple commands to a SCSI device. Queuing commands to a SCSI device can improve performance as it allows the SCSI device itself to determine the most efficient way to order and process commands. SCSI devices that support command tag queuing can be divided into two classes: devices that clear their queues on error and devices that do not. Devices that do not clear their queues on error resume processing of queued commands when the error condition is cleared, typically by receiving the next command. Devices that clear their queues flush all commands currently outstanding. Command tag queueing requires a SCSI adapter, a SCSI device, a SCSI device driver, and a SCSI adapter driver to support the capability. For a SCSI device driver to queue multiple commands to a SCSI device (that supports command tag queuing), the SCSI device driver is generally required to indicate whether each command is a simple command, a head of queue (HOQ) command, or an ordered command.

BRIEF SUMMARY

A technique for handling storage commands includes receiving, by an interface node of a data storage system, a first storage command. The interface node determines whether the first storage command is a head of queue (HOQ) command. In response to determining the first storage command is an HOQ command, the interface node increments a constrained command count and issues the first storage command to a first worker processor core for processing. In response to determining the first storage command is not an HOQ command, the interface node processes the first storage command as a non-HOQ command.

The disclosed techniques may be implemented as a method, a data storage system, and/or a program product (including program code stored in a storage device).

BRIEF DESCRIPTION OF THE SEVERAL VIEWS OF THE DRAWINGS

FIG. 7 illustrates an exemplary codeword stored in each data page in accordance with the present disclosure;

FIG. 8 depicts an exemplary codeword stored in each data protection page in accordance with the present disclosure;

DETAILED DESCRIPTION

Figure 1A:
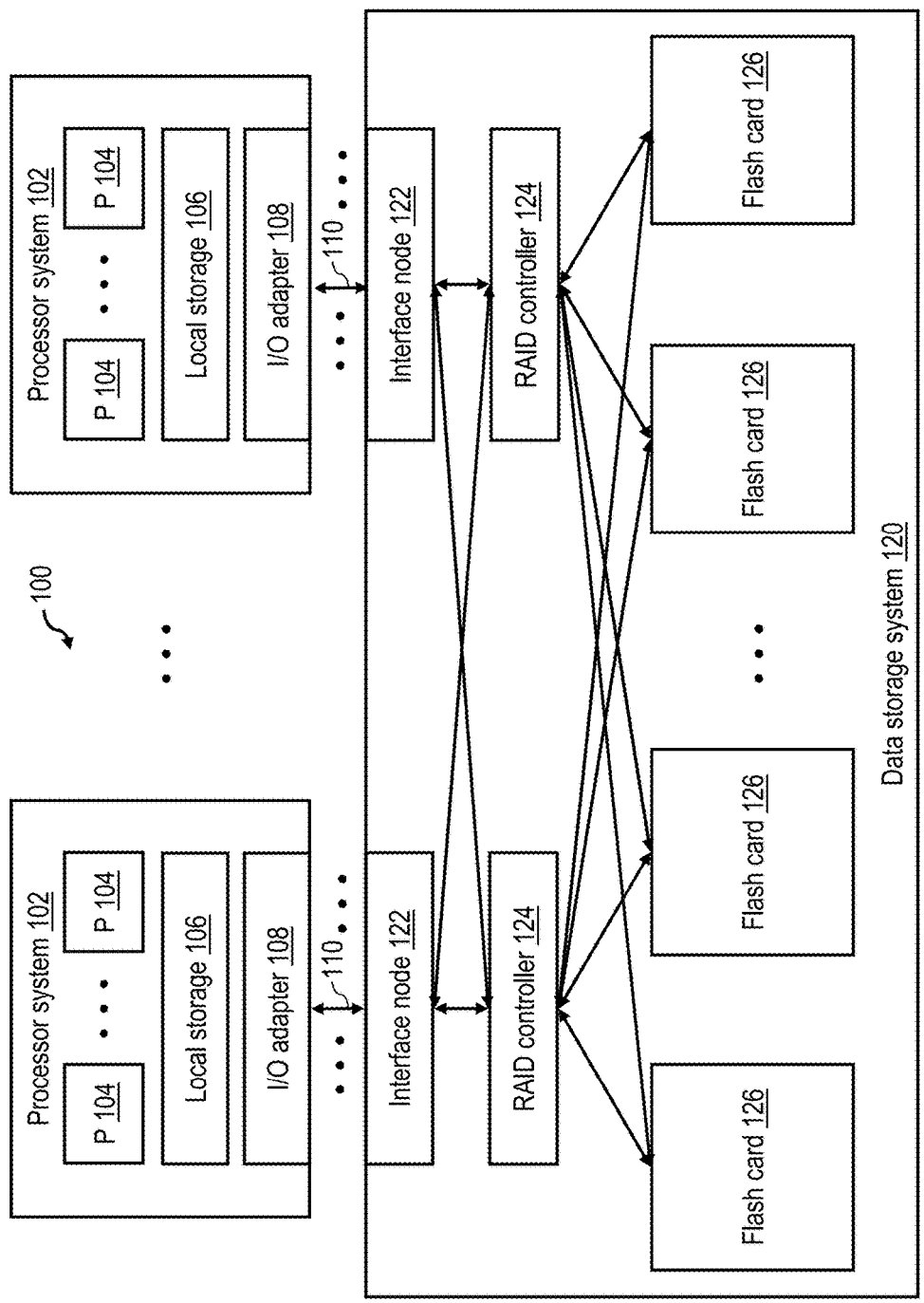
FIG. 1A is a high level block diagram of a data processing environment in accordance with one embodiment.

Small computer system interface (SCSI) implementations face continued demand for performance increases in a computer architecture age where parallel execution dominates hardware improvements. While modern flash arrays can perform many commands simultaneously in parallel, storage network interfaces are still required to adhere to storage protocol ordering constraints.

According to embodiments of the present disclosure, a parallel design is implemented that facilitates leveraging parallel hardware in the execution of storage commands in a single task set, while at the same time synchronizing commands and minimizing the impact of synchronization on the performance of a data storage system. According to one aspect of the present disclosure, a SCSI target is implemented that includes a single processor core (core) that receives SCSI commands and schedules work for other cores without the use of spinlocks, semaphores, or other core synchronizing mechanisms. According to one or more aspects, techniques for lockless storage command parallel decoding and scheduling include implementing a producer core/consumer core ring buffer (queue) architecture to distribute command processing over multiple cores, while retaining the ability to maintain strict ordering of command execution that is required in certain protocols.

In at least one embodiment, cores exchange information through dedicated producer-consumer queues. Each queue has one associated producer core and one associated consumer core. In one or more embodiments, the only part of the shared queue structure that a consumer core may modify is the receive pointer. Elements of a shared queue before a transmit pointer and before or equal to a receive pointer are ready for processing by the consumer core. In one embodiment, a core 'A' is configured to receive SCSI commands from a transport protocol and notify a core 'B' that a command has been received. In this embodiment, core 'B' is configured to partially decode a received command and identify whether the received command has scheduling constraints (e.g., the command is (explicitly or implicitly) a head of queue (HOQ) command or an ordered command). Whether a received command has constraints and whether an existing task set has any constraints determines whether the received command can be processed immediately or is required to be queued for later processing.

Based on the SCSI specification, commands in a 'dormant queue' are commands that are activated as soon as a last HOQ/ordered command completes. An ordered command that is waiting in a 'dormant queue' is activated when there are no longer any active simple, ordered, or HOQ commands that constrain the ordered command. It should be appreciated that a 'dormant queue' does not include any HOQ commands. In one or more embodiments, when a command is ready to be serviced, core 'B' chooses a 'worker' core 'C' to service the command from available worker cores. For example, core 'B' may choose the worker core 'C' with the fewest outstanding commands and pass the command to the worker core 'C' via an associated queue. When the core 'C' needs to send or receive data, the core 'C' notifies the core 'A' via another associated queue. When the command is completed, the worker core 'C' notifies the core 'A', at which point the core 'A' sends a SCSI response to the host. In general, the various disclosed embodiments guarantee that a data storage system, when functioning as a SCSI target device, follows strict ordering and may thus advantageously implement lockless scheduling under the SCSI protocol, which defines strict command processing ordering as per the SAM-4 standard (ANSI INCITS 447-2008).

In general, the disclosed techniques are configured to follow ordering rules irrespective of the number of threads, processors, and/or cores. The disclosed techniques are particularly advantageous when implemented in a storage device that has many parallel-executing flash controllers and flash chips. According to other aspects of the present disclosure, pre-decoding a section of each command is implemented in order to determine an optimal shared buffer to which the command should be queued for further processing. In general, pre-decoding a section of each command facilitates load balancing and reduces variability in timing and performance of different threads and cores, as well as reducing stalls.

As previously mentioned, according to one or more aspects of the present disclosure, a dedicated queue is implemented for each communication path between a producer core/consumer core pair. By implementing a point-to-point queue, a producer core only has to track a next insertion slot in the queue and a consumer core only has to track a next extraction slot in the queue. According to the present disclosure, the number of messages or data queues is not bounded, thus, an optimal queue depth can be selected to guarantee that reader/writer processes are not starved or have to pause. In particular, pre-decoding and intelligently selecting an optimal data queue based on the pre-decoding facilitates load balancing of messages/data and generally reduces any mismatch in processing capability between producer cores and consumer cores.

With reference to the figures and with particular reference to FIG. 1A, there is illustrated a high level block diagram of an exemplary data processing environment 100 including a data storage system 120 that is configured to process storage commands (e.g., SCSI commands) according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards (or more broadly multiple flash devices) 126 including, in this example, NAND flash storage media. In other embodiments, other lossy storage media can be employed.

Figure 1B:
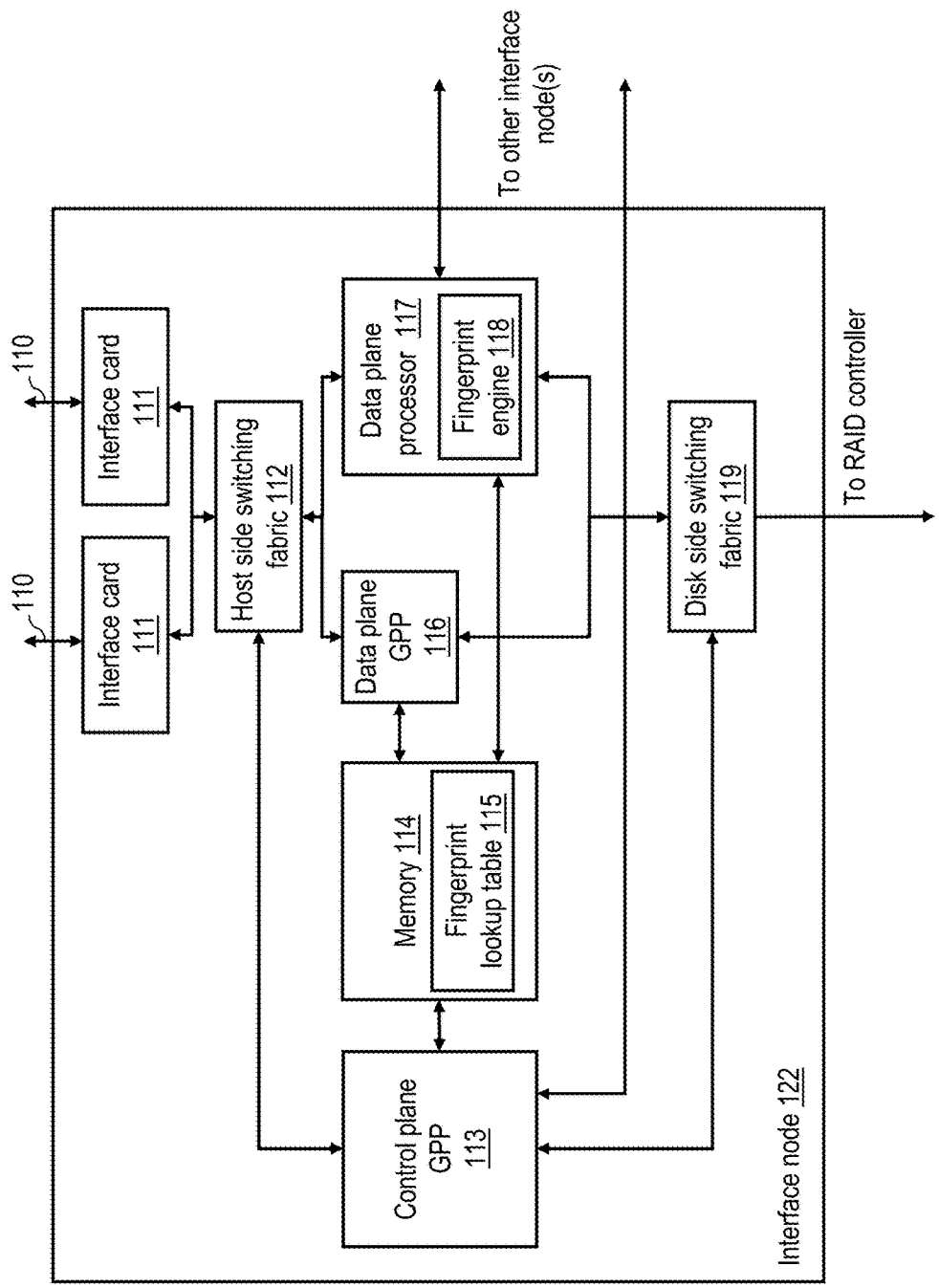
FIG. 1B is a more detailed block diagram of an exemplary interface node of the data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA)). Control plane GPP 113, data plane GPP 116, and data plane processor 117 are all connected to memory 114 which may be implemented as a shared memory between these components, separate memories, or a combination thereof.

Data plane processor 117 implements a fingerprint engine 118 that generates fingerprints for received data pages that are to be written to or read from flash cards 126. Data plane processor 117 may further access a fingerprint lookup table (LUT) 115 stored in memory 114 either directly or by communicating with data plane GPP 116 or control plane GPP 113. Fingerprints for received data pages may include hashes, CRCs, or a combination of hashes and CRCs. Fingerprint engine 118 (or other logic in data plane processor 117) may also be configured to determine compressed page sizes of received data pages. Fingerprint LUT 115 stores fingerprints for data pages that are stored in flash cards 126. It should be appreciated that fingerprint LUT 115 may, at any given time, only store fingerprints for some of the data pages stored in flash cards 126 due to memory size limitations.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to flash cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
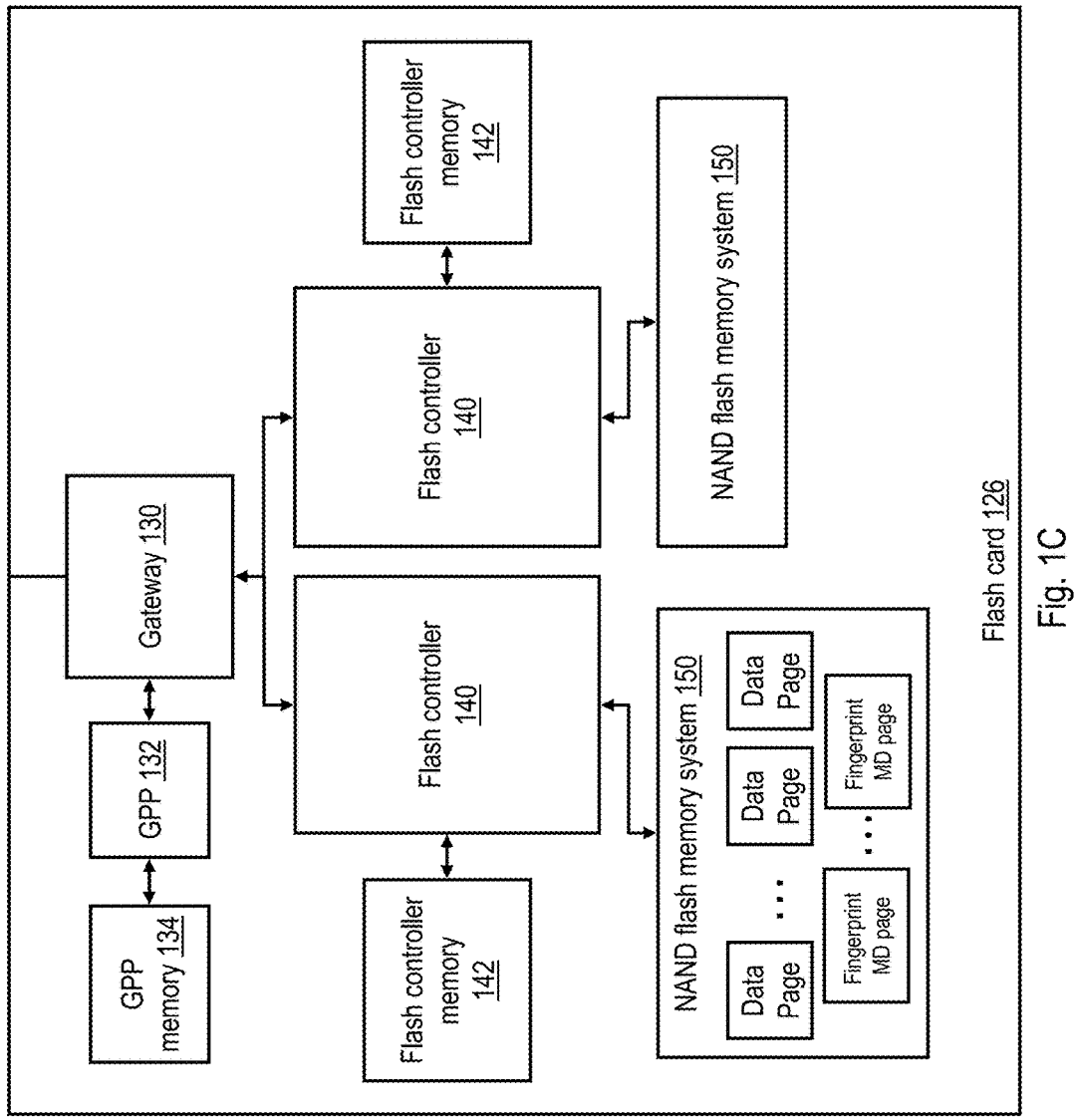
FIG. 1C is a more detailed block diagram of an exemplary flash card of the data storage system of FIG. 1A.

FIG. 1C depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1C) associated with NAND flash memory systems 150. For example, NAND flash memory systems 150 may store a combination of data pages and one or more fingerprint metadata (MD) pages that provide fingerprint metadata for one or more data pages. In an alternative embodiment, fingerprint MD may be stored in a different memory than data pages.

Flash controllers 140 implement a Flash Translation Layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed page sizes of data pages stored in NAND flash memory system 150 and even further their CRC values. According to aspects of the present disclosure, the compressed page sizes of stored data pages may be utilized in a determination of whether a received data page has a same size as a stored data page in the deduplication techniques disclosed herein and is, thus, a candidate duplicate data page.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
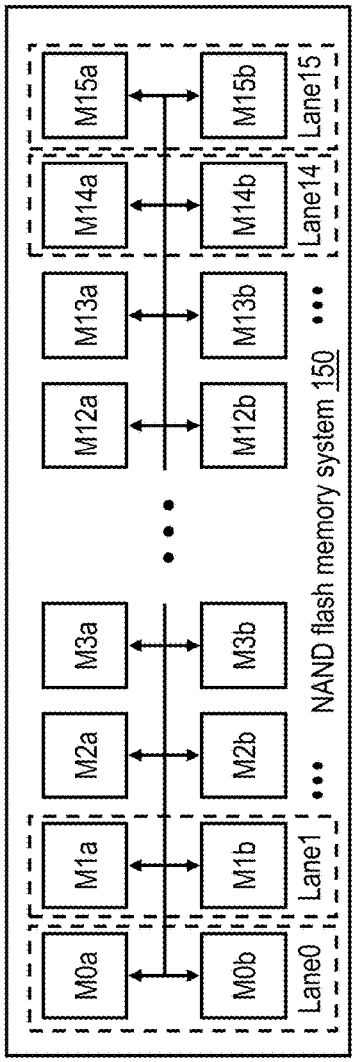
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
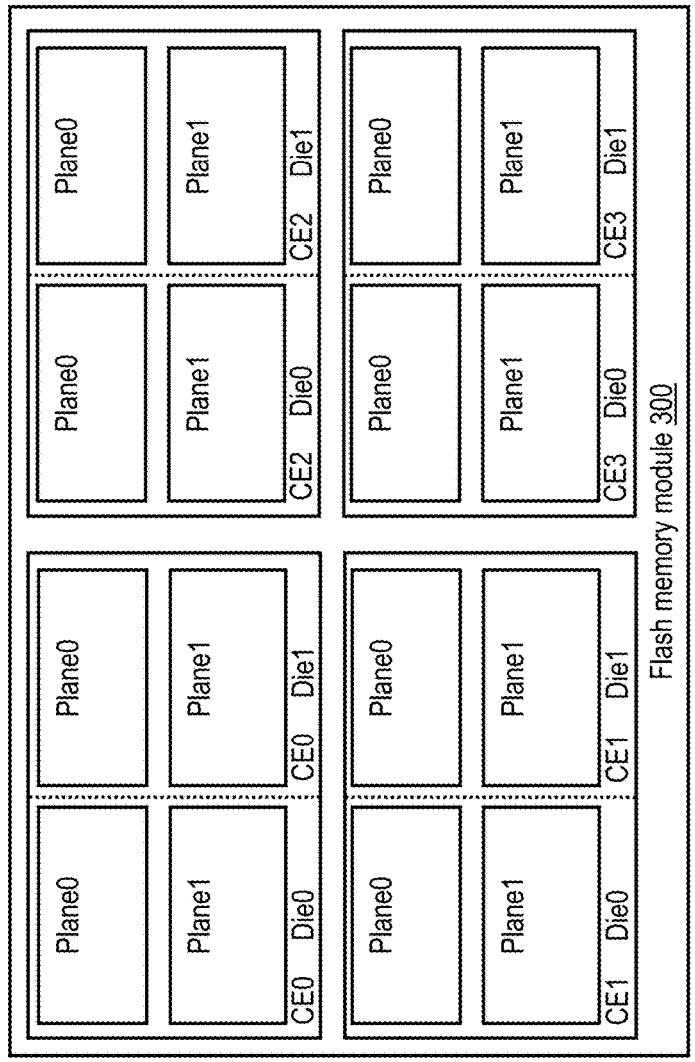

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
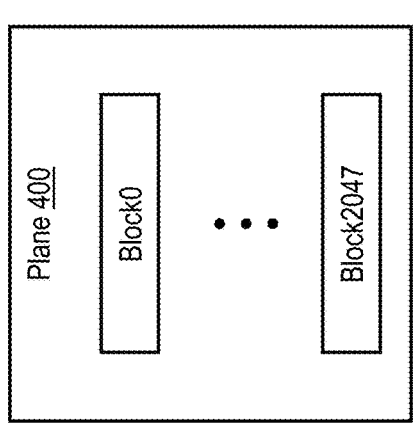
Figure 5:
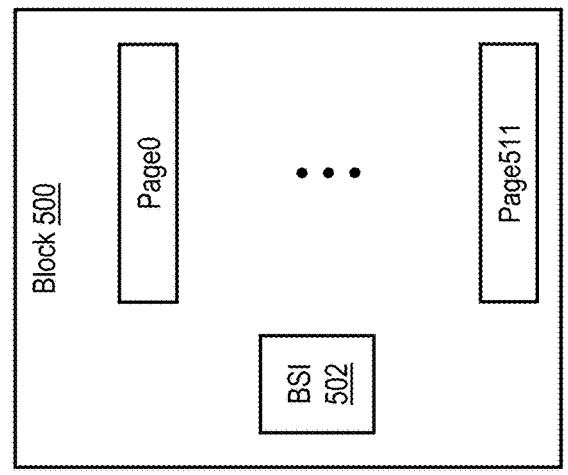

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes block status information (BSI) 502, which indicates the status of each physical page in that block 500 as retired (i.e., no longer used to store user data) or non-retired (i.e., active or still usable to store user data). In various implementations, BSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
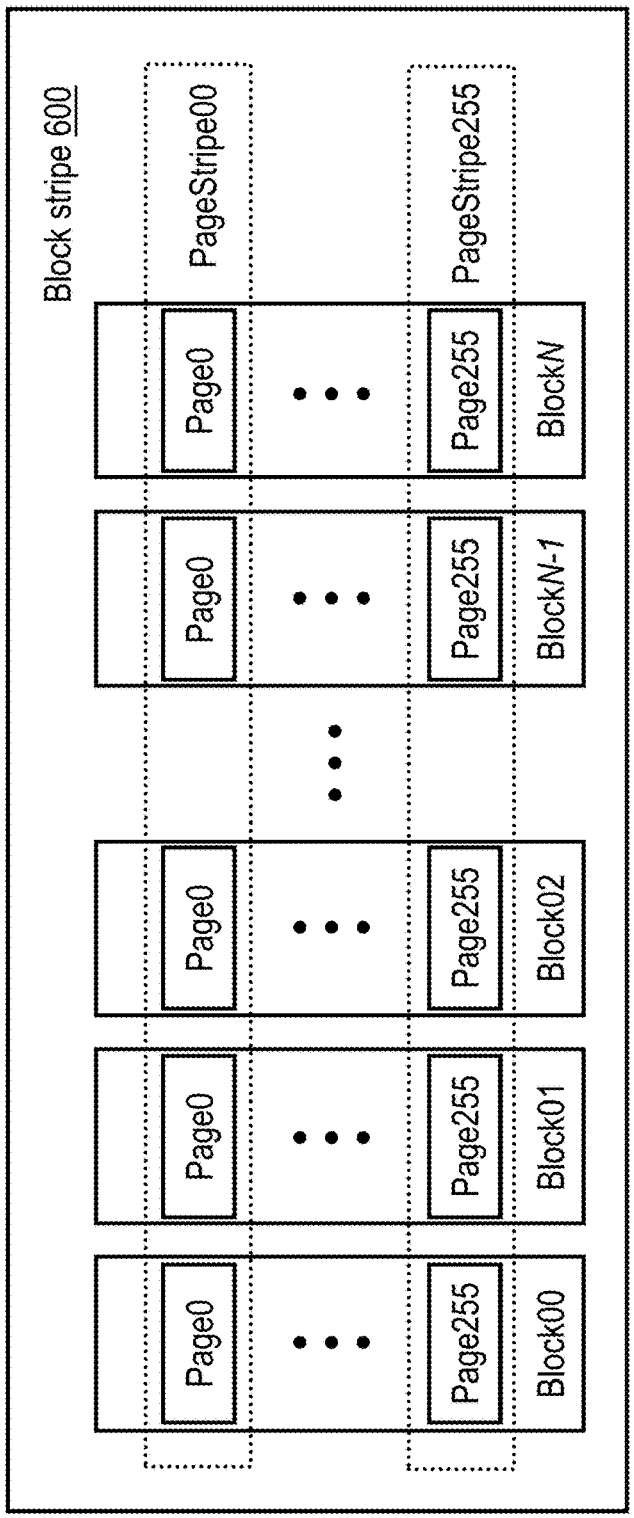
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
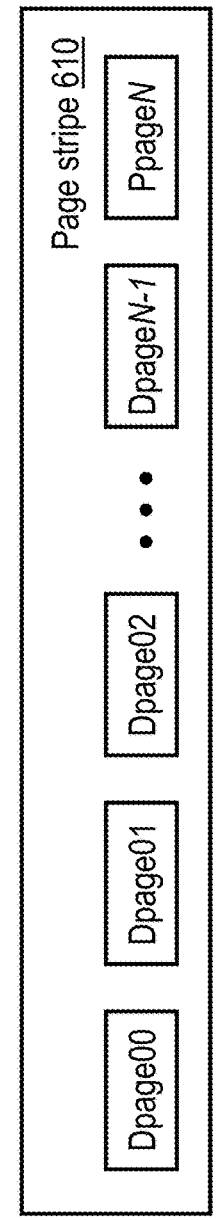
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below. Similarly to logical data pages that are being placed into page stripes of a block stripe, fingerprint MD pages may be placed there as well. Logical data pages and fingerprint MD pages may be intermingled. In fact, flash card 126 may actually not know the difference between regular logical data pages and fingerprint MD pages. The fingerprint MD pages may be stored on a dedicated meta-data volume controlled by the interface nodes 122 and not visible to the processor system 102. As the flash cards 126 have no notion of volumes, fingerprint MD page operations are handled as regular read and write operations.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706. In case data field 702 holds fractions of logical data pages, LBA field 704 further holds information on which fractions of logical data pages are stored in data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of LBA fields 704 of codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142. As mentioned above, an LPT table, such as LPT table 900, can also be configured to store compressed page sizes of data pages stored in NAND flash memory systems 150 to aid in data deduplication.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on GPP 132 utilizes to facilitate garbage collection. As noted above, through the write process, pages are invalidated, and therefore portions of NAND flash memory system 150 become unused. An associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid.

In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on an appropriate ready-to-use (RTU) queue 906 in associated GPP memory 134.

Figure 9:
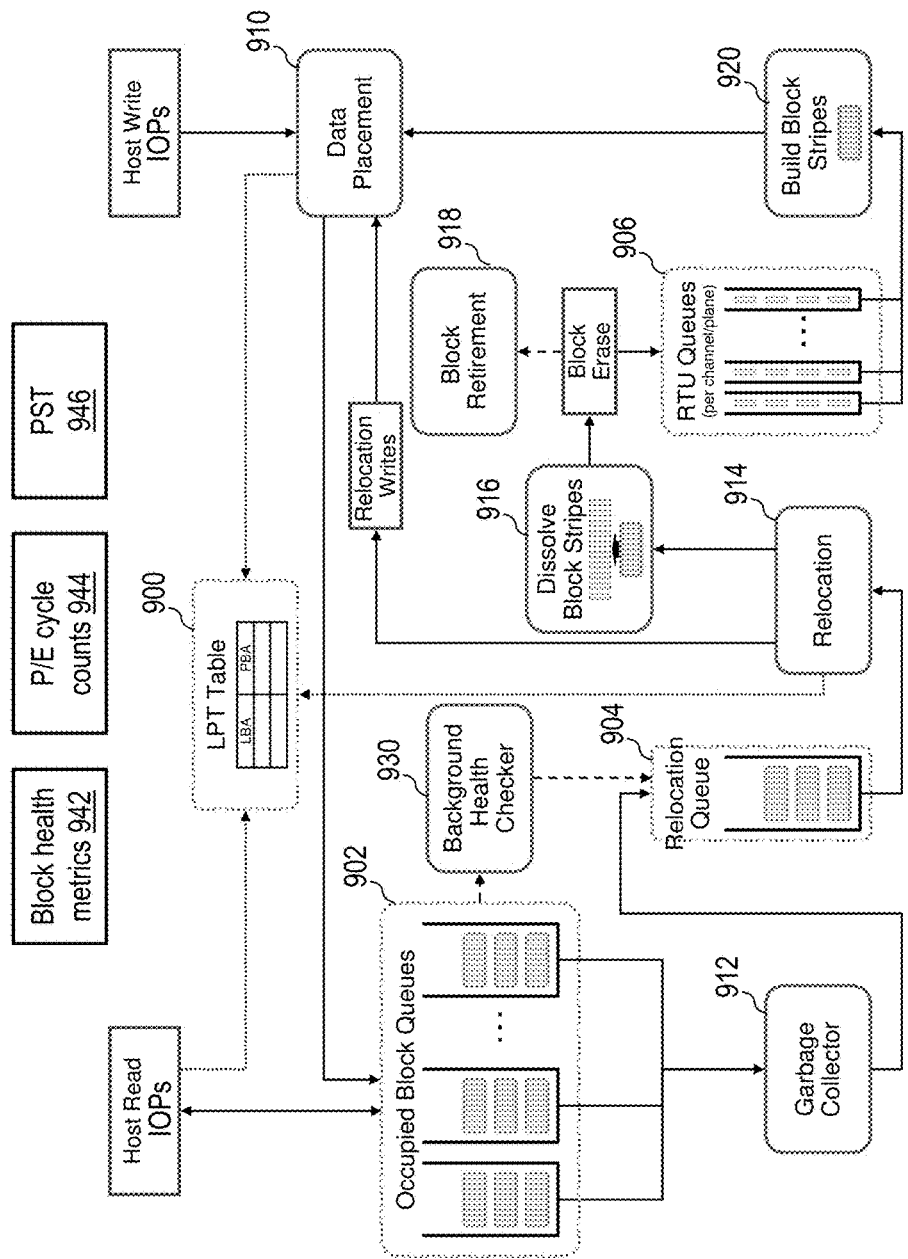
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of block health metrics 942, background health checker 930 may place block stripes on relocation queue 904 for handling by relocation function 914.

Figure 10:
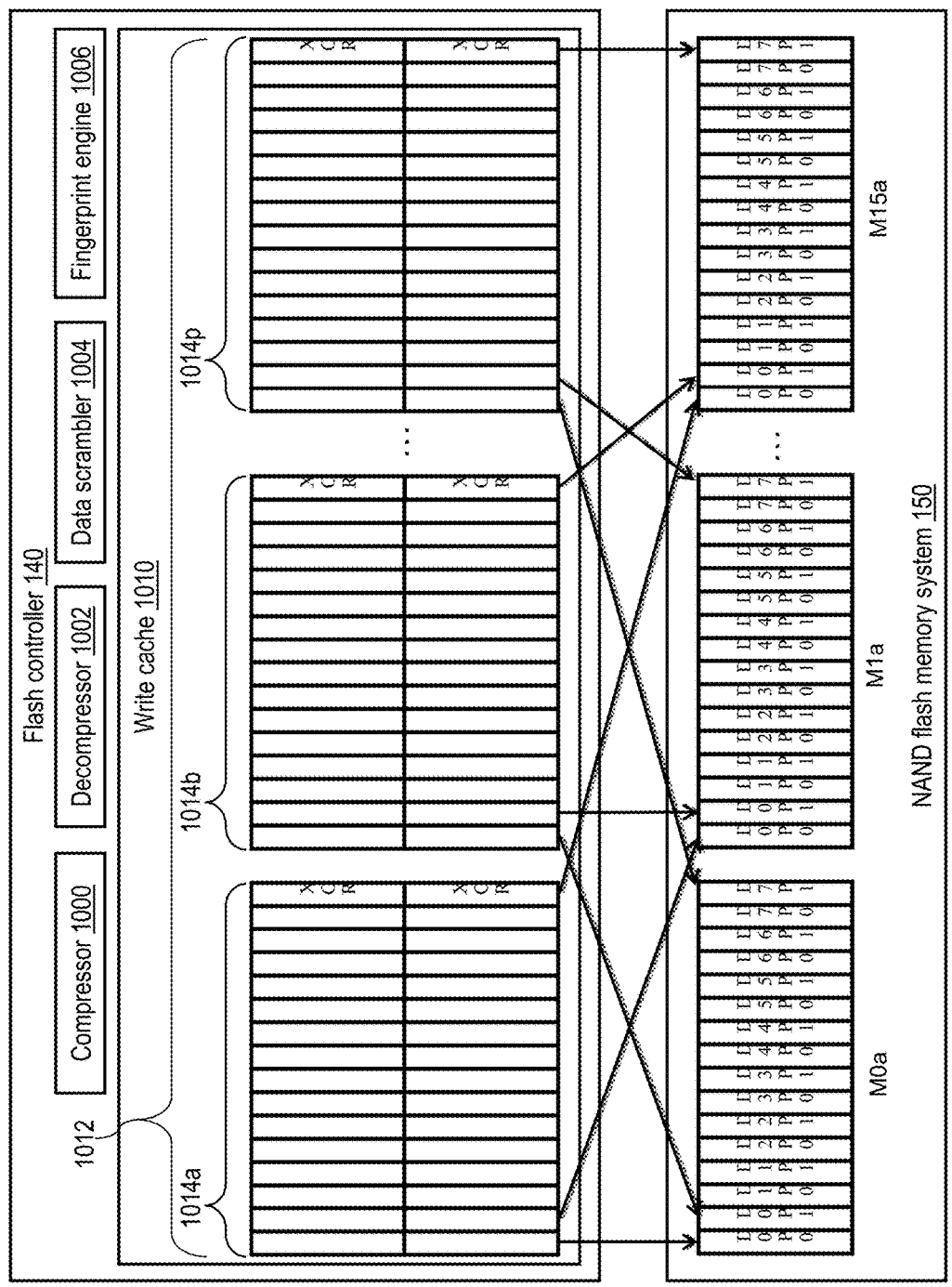
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, M1a, and M15b of a NAND flash memory system 150, for example, on a page-by-page basis rather than on a block-by-block basis, or a combination thereof. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 may also include an optional fingerprint engine 1006 similar to the fingerprint engine 118 in interface node 122. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014a-1014p, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014a to a first physical page (e.g., Page23) in each of flash memory modules M0a-M15a, writes the data pages from segment 1014b to a second physical page in each of flash memory modules M0a-M15a, and writes the data pages from segment 1014p to a sixteenth physical page in each of flash memory modules M0a-M15a.

As mentioned above, in one or more embodiments of the present disclosure, a received data page (e.g., candidate duplicate page) may be compressed to determine a compressed page size of the given candidate duplicate page. Compressed page sizes for data pages stored in the data storage system may then be retrieved (e.g., from an LPT table). The size of the candidate duplicate page may then be compared to compressed page sizes of the stored data pages to determine if the size of the candidate duplicate page is equal to one or more of the compressed page sizes of the stored data pages. If none of the size values are the same, the stored data pages cannot be the same as the candidate duplicate page.

If the size of the candidate duplicate page is the same as the size of one or more of the stored data pages, CRC values of the stored data pages may be read from flash page metadata (MD) or from a data page. The read CRC values may then be adjusted to remove header information contributions, as well as data contributions from other data pages store in the same codeword. The adjusted CRC values may then be compared to the CRC value of the candidate duplicate page and if none of the CRC values match the CRC of the candidate duplicate page, the candidate duplicate page cannot be a duplicate data page. In the event one or more stored data pages have the same CRC value as the candidate duplicate page, a fingerprint for the one or more stored data pages with matching CRC values may then be compared to a fingerprint for the candidate duplicate page.

The calculation of the fingerprint can be executed by fingerprint engine 118 and the comparison can be performed by control plane GPP 113, data plane processor 117, or data plane GPP 116. Alternatively, fingerprint calculation and comparison may also be delegated to flash controller 140 if a fingerprint engine 1006 is available in flash card 126. In the event a fingerprint for the candidate duplicate page is the same as a fingerprint for one of the stored data pages, a data storage system may replace the received data page with a reference to a corresponding data page included in the one or more data pages stored in the storage system, and the candidate duplicate data page may be discarded (as the candidate duplicate page is a duplicate data page). In the event a fingerprint for the candidate duplicate page is not the same as a fingerprint for one of the stored data pages, the candidate duplicate data page is stored in the storage system (as the candidate duplicate page is not a duplicate data page).

Depending on the availability of page size and CRC value, the disclosed tests can be readily adapted by changing the order of the checks.

Figure 11:
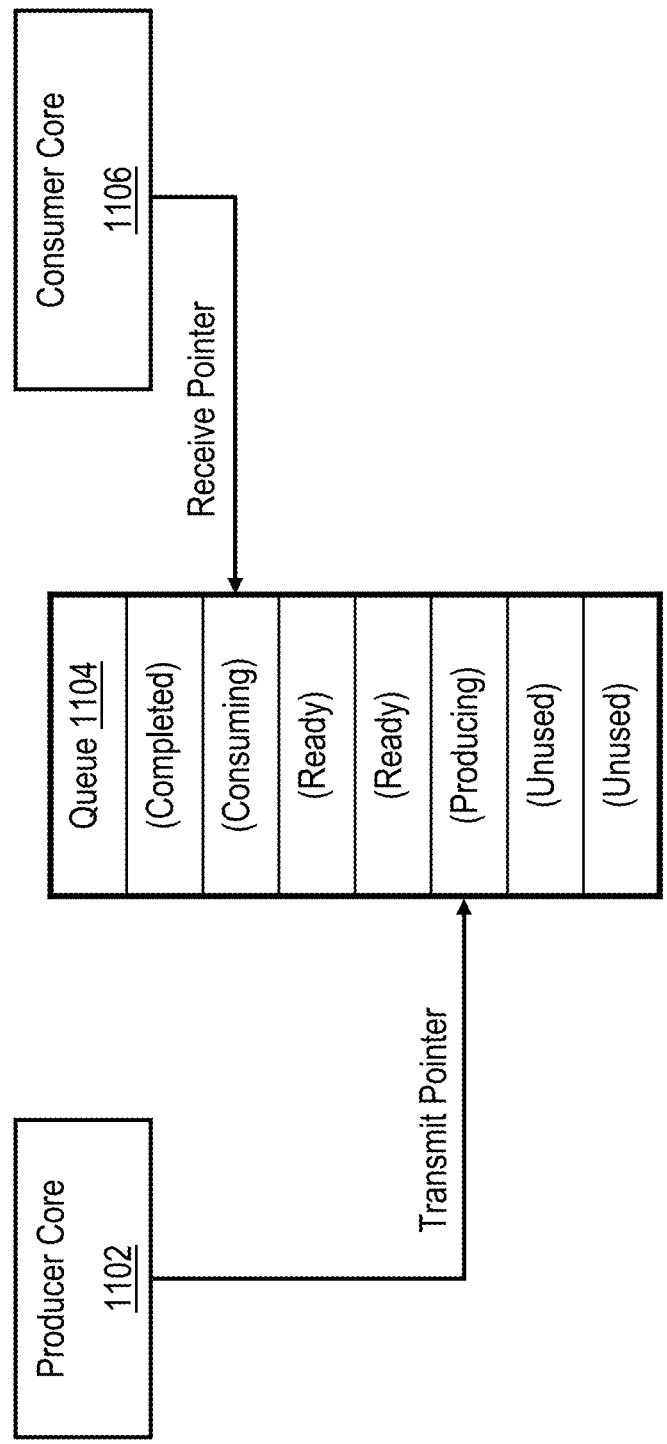
FIG. 11 depicts an exemplary producer processor core communicating with an exemplary consumer processor core via a dedicated queue, according to one embodiment of the present disclosure.

With reference to FIG. 11, a producer core 1102 is illustrated as communicating with a consumer core 1106 via a dedicated queue 1104, i.e., a queue that is only used for communications from producer core 1102 to consumer core 1106. Producer core 1102 maintains a 'transmit pointer' that points to a current location (labeled 'producing') in queue 1104 where a next command is to be written. Consumer core 1106 maintains a 'receive pointer' that points to a current location (labeled 'consuming') in queue 1104 where a next command is to be read. Locations in queue 1104 between the 'receive pointer' and the 'transmit pointer' are ready to be processed by consumer core 1106.

Figure 12:
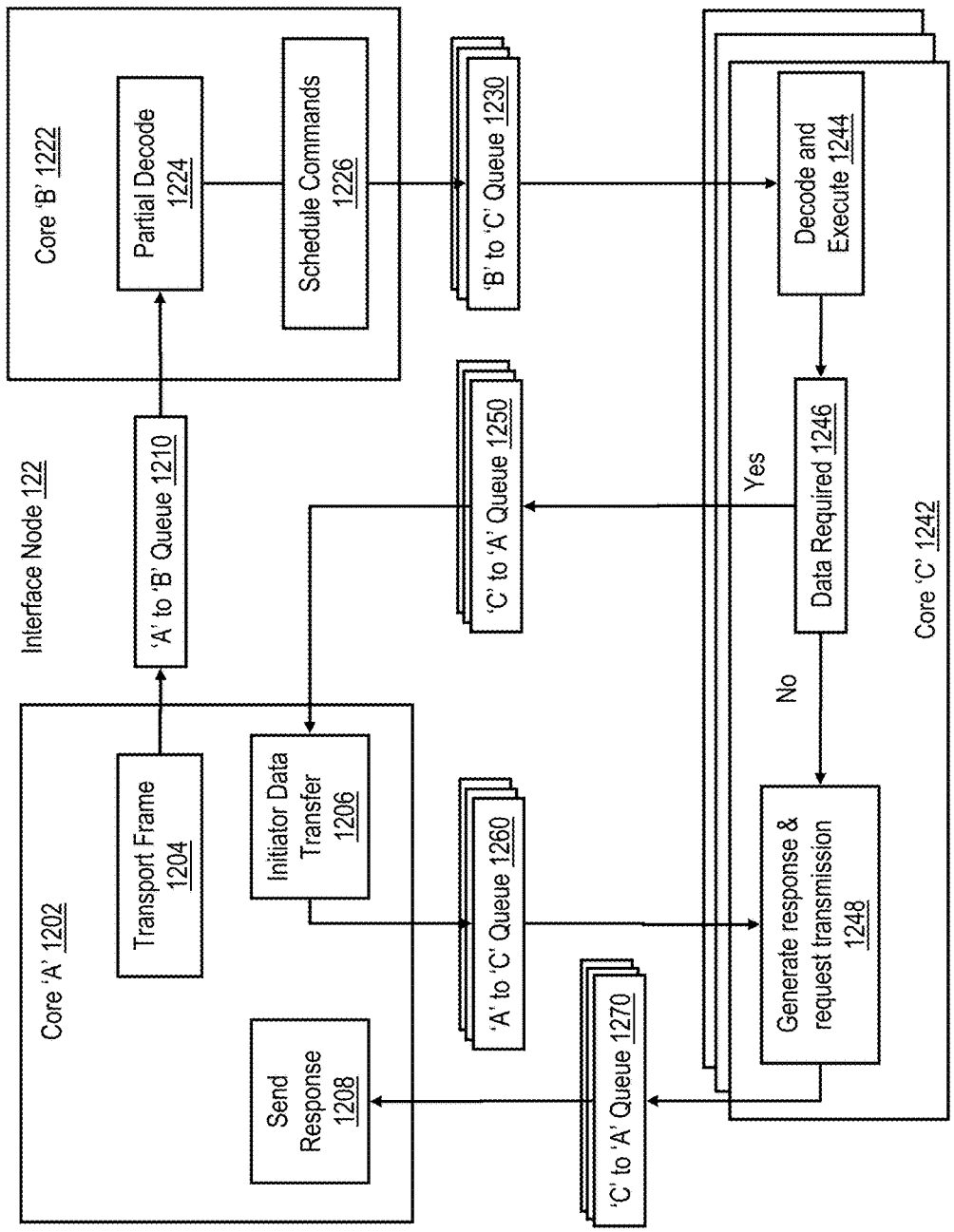
FIG. 12 depicts an exemplary architecture for processing storage commands according to one embodiment of the present disclosure.

With reference to FIG. 12, components of interface node 122, and more specifically components of data plane processor 117 and memory 114, are illustrated in additional detail. A processor core 'A' 1202 is illustrated as including a transport frame unit 1204 that is configured to facilitate communications, at a transport layer level, with processor system 102. In various embodiments, processor system 102 issues storage commands (e.g., SCSI commands) to interface node 122, via I/O adapter 108. Transport frame unit 1204 processes received storage commands and queues the received storage commands in 'A' to 'B' queue 1210. Core 'B' 1222 is configured to pull commands from queue 1210 for processing. Core 'B' 1222 includes a partial decode unit 1224 that performs a partial decode on each command to determine whether the command is a simple command, an HOQ command, or an ordered command. Core 'B' 1222 also includes a schedule commands unit 1226 that determines how HOQ commands, ordered commands, and simple commands are scheduled for processing. Specifically, schedule commands unit 1226 determines what 'B' to 'C' queue 1230 a given command is assigned to based on various criteria.

As is illustrated, multiple worker cores 'C' 1242, each of which has a dedicated queue 1230, are configured to further process the received commands. Each worker core 'C' 1242 includes a decode and execute unit 1244, a data required unit 1246, and a generate response and request transmission unit 1248. Decode and execute unit 1244 decodes and executes received commands. Data required unit 1246 determines whether data is required for the command (e.g., whether the command is a write command). In the event that data is required for the command, data required unit 1246 of core 'C' 1242 communicates a data request with core 'A' 1202, via a 'C' to 'A' queue 1250, to request the required data. Initiate data transfer unit 1206 of core 'A' transfers the data for the command to core 'C' 1242 via 'A' to 'C' queue 1260. Data is pulled from queue 1260 by generate and request transmission unit 1248, which causes core 'C' to complete the command using the data (e.g., write the data to a flash memory system 150 of flash card 126). Upon completion of the command, generate and request transmission unit 1248 causes a response to the command to be generated to core 'A' 1202, which is communicated via 'C' to A' queue 1270. Send response unit 1208 of core 'A' reads responses from queue 1270 and causes core 'A' 1202 to send the responses (e.g., command complete or error) to processor system 102, via I/O adapter 108.

In the description above, cores 1202, 1222, and 1242 may be implemented within data plane processor 117 and queues 1210, 1230, 1250, 1260, and 1270 may be implemented within different portions of memory 114 (see FIG. 1B) or another memory. It should be appreciated that while three worker cores are illustrated that more or less than three worker cores may be implemented in a data storage system configured according to the present disclosure. Additionally, while a separate core 'A' and a separate core 'B' are illustrated, the functions of core 'A' and core 'B' may be implemented within a single core.

Figure 13:
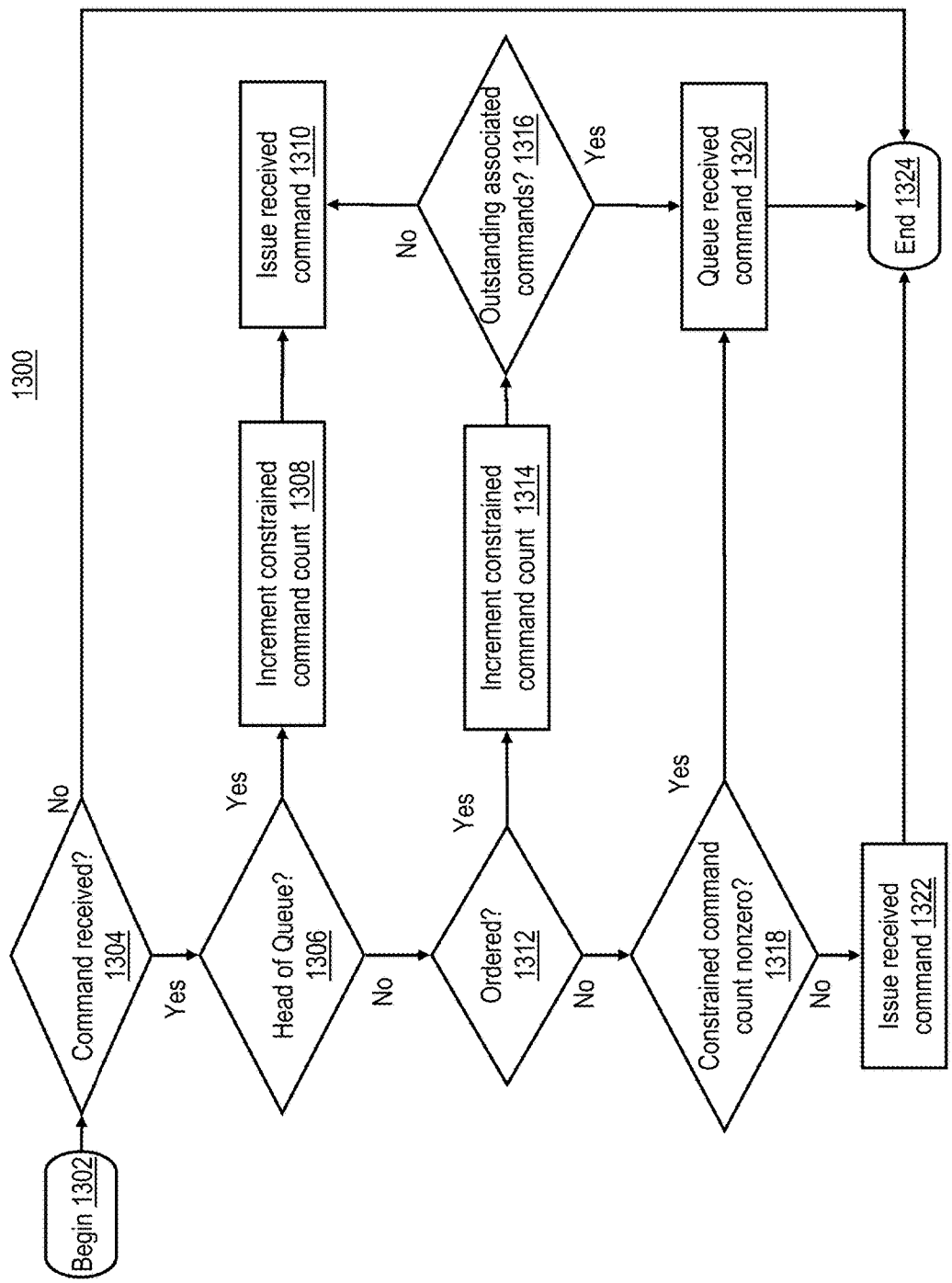
FIG. 13 is a high level logical flowchart of an exemplary process that performs storage command processing, upon command receipt, for a data storage system in accordance with one embodiment of the present disclosure.

With reference to FIG. 13, an exemplary process 1300 for handling storage commands is illustrated, according to one embodiment. In one or more embodiments, process 1300 is initiated, in block 1302, by interface node 122 (or more specifically core 'B' 1222 of data plane processor 117) when a communication is received by interface card 111 of interface node 122. Next, in decision block 1304, core 'B' 1222 determines whether the communication corresponds to a storage command for a flash card 126. In response to the received communication not corresponding to a storage command, control transfers from block 1304 to block 1324, where process 1300 terminates. In response to the received communication corresponding to a storage command control transfers from block 1304 to block 1306, where core 'B' 1222 determines whether the command is an HOQ command. In response to the received command being an HOQ command control transfers from block 1306 to block 1308, where core 'B' 1222 increments a constrained command count (e.g., maintained in memory 114) for an associated flash memory system 150. Next, in block 1310, core 'B' 1222 issues the HOQ command to a queue 1230, associated with a selected worker core 1242, for processing.

In response to the received command not being an HOQ command control transfers from block 1306 to decision block 1312. In block 1312, core 'B' 1222 determines whether the command is an ordered command. In response to the received command being an ordered command control transfers from block 1312 to block 1314, where core 'B' 1222 increments the constrained command count. Next, in decision block 1316, core 'B' 1222 determines whether there are any outstanding associated commands, i.e., any outstanding commands that are directed to a same flash memory system 150 as the ordered command. In response to there not being any outstanding associated commands in block 1316 control transfers to block 1310, where the ordered command is issued to a queue 1230, associated with a selected worker core 1242, for processing.

In response to there being any outstanding associated commands in block 1316 control transfers to block 1320, where the ordered command is queued in a dormant queue (e.g., in memory 114) for later processing (i.e., after any commands queued before the ordered command directed to a same flash memory system 150 as the ordered command are completed). From block 1320 control transfers to block 1324. In response to the received command not being an ordered command control transfers from block 1312 to decision block 1318, where core 'B' 1222 determines whether the constrained command count is non-zero. In response to the constrained command count being non-zero control transfers from block 1318 to block 1320, where the received command is queued in the dormant queue for later processing (e.g., after any HOQ command directed to a same flash memory system 150 as the received command or after any ordered commands directed to a same flash memory system 150 as the received command that preceded the received command are completed). In response to the constrained command count not being non-zero (i.e., the constrained command count is zero) control transfers from block 1318 to block 1322, where core 'B' 1222 issues the received command to a queue 1230, associated with a selected worker core 1242, for processing. Following block 1322 control transfers to block 1324. In the discussion above it should be appreciated that a constrained command count is maintained for each flash memory system 150.

Figure 14:
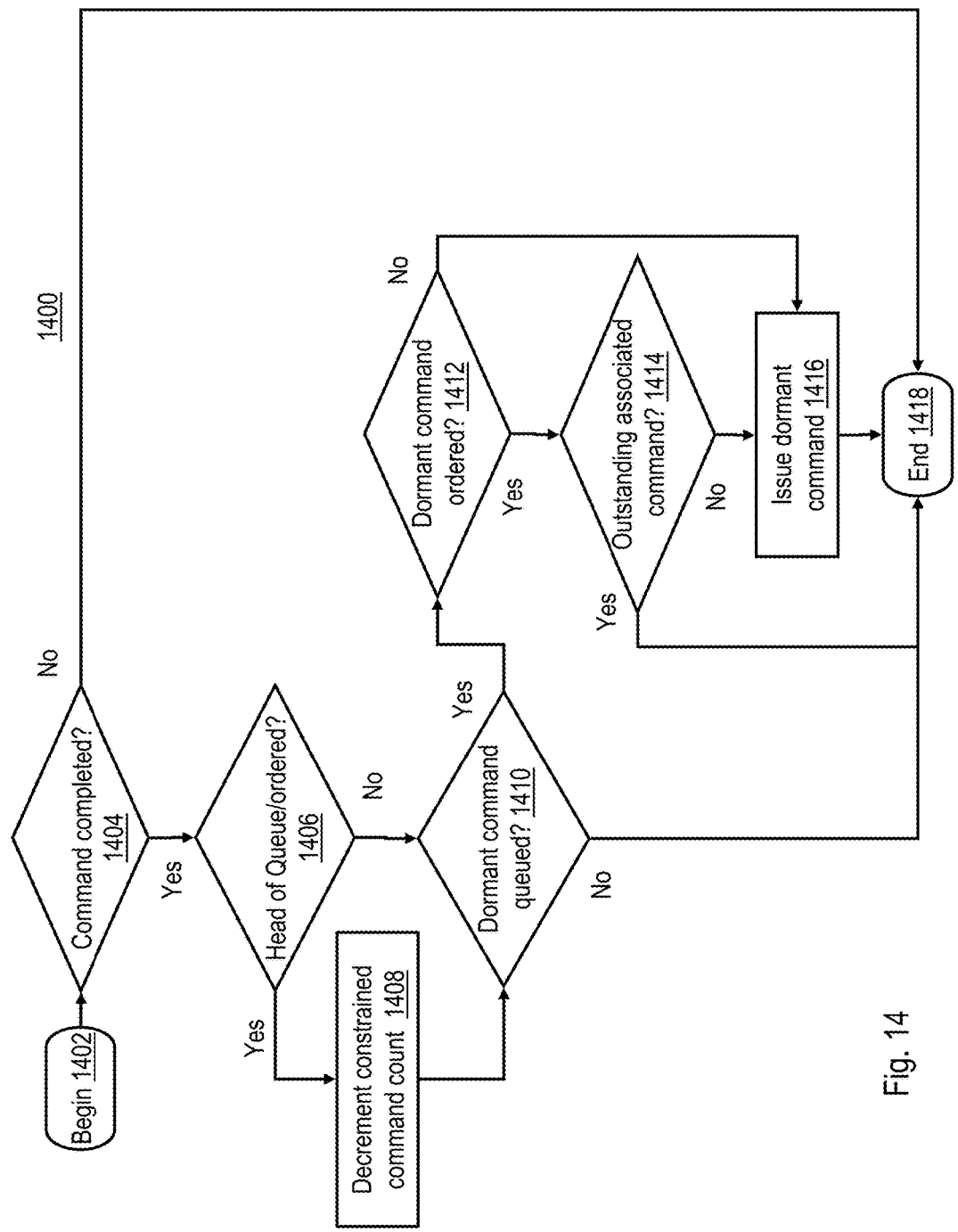
FIG. 14 is a high level logical flowchart of an exemplary process that performs storage command processing, upon command completion, for a data storage system in accordance with one embodiment of the present disclosure.

With reference to FIG. 14, an exemplary process 1400 for handling storage commands is illustrated, according to one embodiment. In one or more embodiments, process 1400 is initiated, in block 1402, by interface node 122 (or more specifically core 'B' 1222 of data plane processor 117) when a communication is received by interface card 111 of interface node 122. Next, in decision block 1404, core 'B' 1222 determines whether the communication corresponds to a completion of storage command for a flash card 126. In response to the received communication not corresponding to completion of a storage command, control transfers from block 1404 to block 1418, where process 1400 terminates. In response to the received communication corresponding to completion of a storage command control transfers to from block 1404 to block 1406, where core 'B' 1222 determines whether the command that completed is a constraining command (e.g., an HOQ command or an ordered command).

In response to the received command being a constraining command control transfers from block 1406 to block 1408, where core 'B' 1222 decrements a constrained command count (e.g., maintained in memory 114) for an associated flash memory system 150. Next, in decision block 1410, core 'B' 1222 determines whether a command is queued in the dormant queue (e.g., maintained in memory 114). In response to a command not being queued in the dormant queue control transfers from block 1410 to block 1418, where process 1400 terminates. In response to a command being queued in the dormant queue control transfers from block 1410 to decision block 1412. In block 1412, core 'B' 1222 determines whether the command queued in the dormant queue is an ordered command.

In response to the command queued in the dormant queue not being an ordered command control transfers from block 1412 to block 1416, where core 'B' 1222 issues the command in the dormant queue to a queue 1230, associated with a selected worker core 1242, for processing. From block 1416 control transfers to block 1418, where process 1400 terminates. In response to the command queued in the dormant queue being an ordered command control transfers from block 1412 to decision block 1414. In block 1414 core 'B' 1222 determines whether there are any outstanding commands associated with the ordered command in the dormant queue. In response to there being any outstanding commands associated with the ordered command in the dormant queue in block 1414 that constrain the ordered command control transfers to block 1418. In response to there not being any outstanding commands associated with the ordered command in the dormant queue in block 1414 that constrain the ordered command control transfers to block 1416. In block 1416 core 'B' 1222 issues the command in the dormant queue to a queue 1230, associated with a selected worker core 1242, for processing. Following block 1416 control transfers to block 1418.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of handling storage commands, comprising:
receiving, by an interface node of a data storage system, a first storage command;
determining, by the interface node, upon initial receipt whether the first storage command is a head of queue (HOQ) command;
in response to determining the first storage command is an HOQ command, incrementing, by the interface node, a constrained command count and issuing the first storage command to a first worker processor core for processing;
in response to determining the first storage command is not an HOQ command, determining, by the interface node, whether the first storage command is an ordered command;
in response to determining the first storage command is an ordered command, incrementing, by the interface node, the constrained command count and determining whether the first storage command has one or more associated constraining storage commands;
in response to determining the first storage command is an ordered command that does not have one or more associated constraining storage commands, issuing, by the interface node, the first storage command to a second worker processor core, that is different than the first worker processor core, for processing; and in response to determining the first storage command is an ordered command that has one or more associated constraining storage commands, queuing, by the interface node, the first storage command in a dormant queue, wherein the associated constraining storage commands correspond to storage commands directed to a same flash memory system of the data storage system which includes multiple flash memory systems.

2. The method of claim 1, further comprising:
in response to determining the first storage command is not an ordered command, determining, by the interface node, whether the constrained command count is non-zero;
in response to determining the constrained command count is non-zero, queueing, by the interface node, the first storage command in the dormant queue; and
in response to determining the constrained command count is not non-zero, issuing, by the interface node, the first storage command to a selected worker processor core for processing.

3. The method of claim 1, wherein the interface node includes a first processor core that handles communications between a processor system and the data storage system, a second processor core that receives storage commands from the first processor core and selects a worker processor core, from among multiple worker processor cores, to process each of the received storage commands, and wherein the issuing the first storage command to the first worker processor core for processing includes writing the first storage command to a queue that is only used for communications from the second processor core to the first worker processor core.

4. The method of claim 1, further comprising:
determining, by the interface node, whether a storage command has completed;
in response to determining a storage command has completed, determining, by the interface node, whether the completed storage command is an HOQ command or an ordered command; and
in response to determining the completed storage command is an HOQ command or an ordered command, decrementing, by the interface node, the constrained command count.

5. The method of claim 4, further comprising:
determining, by the interface node, whether a dormant storage command is queued in the dormant queue;
in response to determining that there is a dormant storage command queued in the dormant queue, determining, by the interface node, whether the dormant storage command is an ordered storage command; and
in response to determining the dormant storage command is not an ordered storage command, issuing, by the interface node, the dormant storage command to a selected worker processor core for processing.

6. The method of claim 5, further comprising:
in response to determining the dormant storage command is an ordered storage command, determining, by the interface node, whether there are any outstanding storage commands constraining the ordered storage command; and
in response to determining that there are not any outstanding storage commands that are constraining the ordered storage command, issuing, by the interface node, the dormant storage command to a selected worker processor core for processing.

7. A data storage system, comprising:
one or more non-volatile memories; and
an interface node coupled to the non-volatile memories, wherein the interface node is configured to:
receive a first storage command;
determine upon initial receipt whether the first storage command is a head of queue (HOQ) command;
in response to determining the first storage command is an HOQ command, increment a constrained command count and issuing the first storage command to a first worker processor core for processing;
in response to determining the first storage command is not an HOQ command, determine whether the first storage command is an ordered command;
in response to determining the first storage command is an ordered command, increment the constrained command count and determining whether the first storage command has one or more associated constraining storage commands;
in response to determining the first storage command is an ordered command that does not have one or more associated constraining storage commands, issue the first storage command to a second worker processor core, that is different than the first worker processor core, for processing; and
in response to determining the first storage command is an ordered command that has one or more associated constraining storage commands, queue the first storage command in a dormant queue, wherein the associated constraining storage commands correspond to storage commands directed to a same flash memory system that includes one or more of the non-volatile memories, and wherein the data storage system includes multiple flash memory systems.

8. The data storage system of claim 7, wherein the interface node is further configured to:
in response to determining the first storage command is not an ordered command, determine whether the constrained command count is non-zero;
in response to determining the constrained command count is non-zero, queue the first storage command in the dormant queue; and
in response to determining the constrained command count is not non-zero, issue the first storage command to a selected worker processor core for processing.

9. The data storage system of claim 7, wherein the interface node includes a first processor core that handles communications between a processor system and the data storage system, a second processor core that receives storage commands from the first processor core and selects a worker processor core, from among multiple worker processor cores, to process each of the received storage commands, and wherein the issuing the first storage command to the first worker processor core for processing includes writing the first storage command to a queue that is only used for communications from the second processor core to the first worker processor core.

10. The data storage system of claim 7, wherein the interface node is further configured to:
determine whether a storage command has completed;
in response to determining a storage command has completed, determine whether the completed storage command is an HOQ command or an ordered command; and
in response to determining the completed storage command is an HOQ command or an ordered command, decrement the constrained command count.

11. The data storage system of claim 10, wherein the interface node is further configured to:

determine whether a dormant storage command is queued in the dormant queue;

in response to determining that there is a dormant storage command queued in the dormant queue, determine whether the dormant storage command is an ordered storage command; and in response to determining the dormant storage command is not an ordered storage command, issue the dormant storage command to a selected worker processor core for processing.

12. The data storage system of claim 11, wherein the interface node is further configured to:

in response to determining the dormant storage command is an ordered storage command, determine whether there are any outstanding storage commands constraining the ordered storage command; and in response to determining that there are not any outstanding storage commands that are constraining the ordered storage command, issue the dormant storage command to a selected worker processor core for processing.

13. A computer program product, the computer program product comprising a computer readable storage medium having program instructions embodied therewith, the program instructions executable by a controller, to cause the controller to:

receive a first storage command;

determine upon initial receipt whether the first storage command is a head of queue (HOQ) command;

in response to determining the first storage command is an HOQ command, increment a constrained command count and issuing the first storage command to a first worker processor core for processing;

in response to determining the first storage command is not an HOQ command, determine whether the first storage command is an ordered command;

in response to determining the first storage command is an ordered command, increment the constrained command count and determining whether the first storage command has one or more associated constraining storage commands;

in response to determining the first storage command is an ordered command that does not have one or more associated constraining storage commands, issue the first storage command to a second worker processor core, that is different than the first worker processor core, for processing; and in response to determining the first storage command is an ordered command that has one or more associated constraining storage commands, queue the first storage command in a dormant queue, wherein the associated constraining storage commands correspond to storage commands directed to a same flash memory system of a data storage system that includes multiple flash memory systems.

14. The computer program product of claim 13, wherein the program instructions executable by the controller further cause the controller to:

in response to determining the first storage command is not an ordered command, determine whether the constrained command count is non-zero;

in response to determining the constrained command count is non-zero, queue the first storage command in the dormant queue; and in response to determining the constrained command count is not non-zero, issue the first storage command to a selected worker processor core for processing.

15. The computer program product of claim 13, wherein the program instructions executable by the controller further cause the controller to:

determine whether a storage command has completed;

in response to determining a storage command has completed, determine whether the completed storage command is an HOQ command or an ordered command;

in response to determining the completed storage command is an HOQ command or an ordered command, decrement the constrained command count;

determine whether a dormant storage command is queued in the dormant queue;

in response to determining that there is a dormant storage command queued in the dormant queue, determine whether the dormant storage command is an ordered command;

in response to determining the dormant storage command is not an ordered command, issue the dormant storage command to a selected worker processor core for processing;

in response to determining the dormant storage command is an ordered command, determine whether there are any outstanding storage commands constraining the ordered storage command; and in response to determining that there are not any outstanding storage commands that are constraining the ordered command, issue the dormant storage command to a selected worker processor core for processing.

* * * * *